US012198584B1

(12) United States Patent
Chen et al.

(10) Patent No.: US 12,198,584 B1
(45) Date of Patent: Jan. 14, 2025

(54) DISPLAY PANEL AND METHOD FOR DETECTING THE SAME

(71) Applicants: AUO (KUNSHAN) CO., LTD., Kunshan (CN); AUO Corporation, Hsin-Chu (TW)

(72) Inventors: Cheng Yu Chen, Hsin-Chu (TW); Yuan-Yuan Ma, Kunshan (CN); Chun-Da Tu, Hsin-Chu (TW); Yan Qu, Kunshan (CN)

(73) Assignees: AUO (KUNSHAN) CO., LTD., Kunshan (CN); AUO Corporation, Hsin-Chu (TW)

( * ) Notice: Subject to any disclaimer, the term of this patent is extended or adjusted under 35 U.S.C. 154(b) by 0 days.

(21) Appl. No.: 18/380,390

(22) Filed: Oct. 16, 2023

(30) Foreign Application Priority Data

Aug. 14, 2023 (CN) ......................... 202311029686.2

(51) Int. Cl.
*G06F 3/00* (2006.01)
*G09G 3/00* (2006.01)

(52) U.S. Cl.
CPC ..... *G09G 3/006* (2013.01); *G09G 2310/0248* (2013.01); *G09G 2310/0281* (2013.01); *G09G 2310/061* (2013.01); *G09G 2310/08* (2013.01); *G09G 2330/12* (2013.01)

(58) Field of Classification Search
None
See application file for complete search history.

(56) References Cited

U.S. PATENT DOCUMENTS 6,795,046 B2 9/2004 Janssen et al.
2019/0287475 A1* 9/2019 Lee ...................... G09G 3/3674

FOREIGN PATENT DOCUMENTS

CN 108962162 A 12/2018
CN 108873525 B 9/2019
CN 110459155 B 10/2022

* cited by examiner

*Primary Examiner* — Joseph R Haley
(74) *Attorney, Agent, or Firm* — WPAT, PC

(57) ABSTRACT

The invention provides a display panel and a method for detecting the same, a display device and a storage medium. The display panel comprises a substrate having a display area; a plurality of pixel units disposed in the display area; a plurality of signal lines electrically connected to the plurality of pixel units to transmit driving signals to the plurality of pixel units; a charge coupling unit corresponding to at least a part of the plurality of signal lines for coupling the driving signals into potential signal; and a voltage detection unit electrically connected to the charge coupling unit for receiving the potential signal and determining the driving signals.

19 Claims, 7 Drawing Sheets

DISPLAY PANEL AND METHOD FOR DETECTING THE SAME

BACKGROUND OF THE INVENTION

1. Field of the Invention

The invention relates to a display panel and a method for detecting the same, and particularly, to a display panel and a method for detecting the same, a display device and a storage medium capable of detecting on the premise of ensuring integrity of the display panel.

2. Related Art

With development of science and technology, the display devices are widely applied to many electronic products, such as, mobile phones, tablet computers, watches, vehicles and the like.

After the existing display panels are produced, if analytical test shall be performed on the products (for example, coping with customer complaint analysis or other abnormal analysis), it is often implemented by the way of destroying the products (for example, dismantling the optical glass (CG) to facilitate contacting test points on the display panel through a probe), such that testing causes damage to the products, or testing difficulty is increased, and operation is not convenient.

Therefore, how to achieve product testing on the premise of maintaining integrity of the display panel without damaging the display panel is actually one of the problems to be solved.

SUMMARY OF THE INVENTION

The embodiments of the invention provide a display panel and a method for detecting the same, a display device and a storage medium, which can test the display panel conveniently, and improve testing efficiency on the premise of ensuring integrity of the display panel.

The display panel in one embodiment of the invention comprises a substrate having a display area; a plurality of pixel units disposed in the display area; a plurality of signal lines electrically connected to the plurality of pixel units to transmit driving signals to the plurality of pixel units; a charge coupling unit corresponding to at least a part of the plurality of signal lines for coupling the driving signals into potential signal; and a voltage detection unit electrically connected to the charge coupling unit for receiving the potential signal and determining the driving signals.

In the display panel, the driving signals are timing pulse signals, and the potential signal is a tiered voltage.

In the display panel, the voltage detection unit comprises a determination module for determining whether the tiered voltage is within a preset voltage range.

In the display panel, the voltage detection unit further comprises a result output unit for outputting a feedback signal when the tiered voltage is not within the preset voltage range.

In the display panel, the tiered voltage comprises a plurality of step voltages, the preset voltage range comprises a plurality of voltage intervals, and each step voltage corresponds to one voltage interval.

In the display panel, the plurality of signal lines comprise a first group of signal lines and a second group of signal lines, the voltage detection unit comprises a first detection unit, and the charge coupling unit comprises a first coupling unit electrically connected to the first detection unit and corresponding to the first group of signal lines.

In the display panel, the plurality of signal lines further comprise a third group of signal lines, the voltage detection unit further comprises a second detection unit, and the charge coupling unit comprises a second coupling unit electrically connected to the second detection unit and corresponding to the third group of signal lines.

In the display panel, the display panel further comprises a driving circuit electrically connected to the plurality of signal lines for sequentially supplying the timing pulse signal to the plurality of signal lines within one driving period.

In the display panel, the display panel further includes a peripheral area at least on one side of the display area, and the display panel further comprises: a driving element located in the peripheral area, wherein the voltage detection unit is provided on the driving element.

In the display panel, the driving element comprises a first pin electrically connected to the charge coupling unit and the voltage detection unit, respectively.

In the display panel, the driving element further comprises a charge releasing unit electrically connected to the charge coupling unit.

In the display panel, the driving element comprises a second pin electrically connected to the charge coupling unit and the charge releasing unit, respectively.

In the display panel, the first pin and the second pin are the same pin or different pins.

In the display panel, a display frame comprises a first time period where the voltage detection unit determines the driving signals, and a second time period where the charge releasing unit releases coupled charge in the charge coupling unit.

In the display panel, the first time period is a data refresh phase, and the second time period is a blanking phase.

In the display panel, the driving element further comprises a switch unit disposed between the charge coupling unit and the voltage detection unit as well as the charge releasing unit, wherein in the first time period, the switch unit is turned on between the charge detection unit and the charge coupling unit, and turned off between the charge releasing unit and the charge coupling unit; and in the second time period, the switch unit is turned off between the charge detection unit and the charge coupling unit, and turned on between the charge releasing unit and the charge coupling unit.

In the display panel, the display panel further comprises: a signal detection line at least partially overlapping the plurality of signal lines; wherein the charge coupling unit is disposed between the plurality of overlapped signal lines and the signal detection line.

A method for detecting the display panel in one embodiment of the invention is configured to detect the display panel, the method comprising: acquiring the potential signal of the charge coupling unit; and determining whether the potential signal is within a preset voltage range.

In the detection method, the potential signal is a tiered voltage, and the method further comprises: outputting a feedback signal when the tiered voltage is not within the preset voltage range.

In the detection method, the method further comprises: releasing coupled charge in the charge coupling unit.

A display device in one embodiment of the invention comprises any of the display panel described above.

A storage medium in one embodiment of the invention is configured to store computer programs, wherein the computer programs are configured to perform any of the detection method described above.

Hereinafter the invention is described in details combining with the accompanying drawings and specific embodiments, but the invention is not limited thereto.

DETAILED EMBODIMENTS OF THE INVENTION

Figure 1:
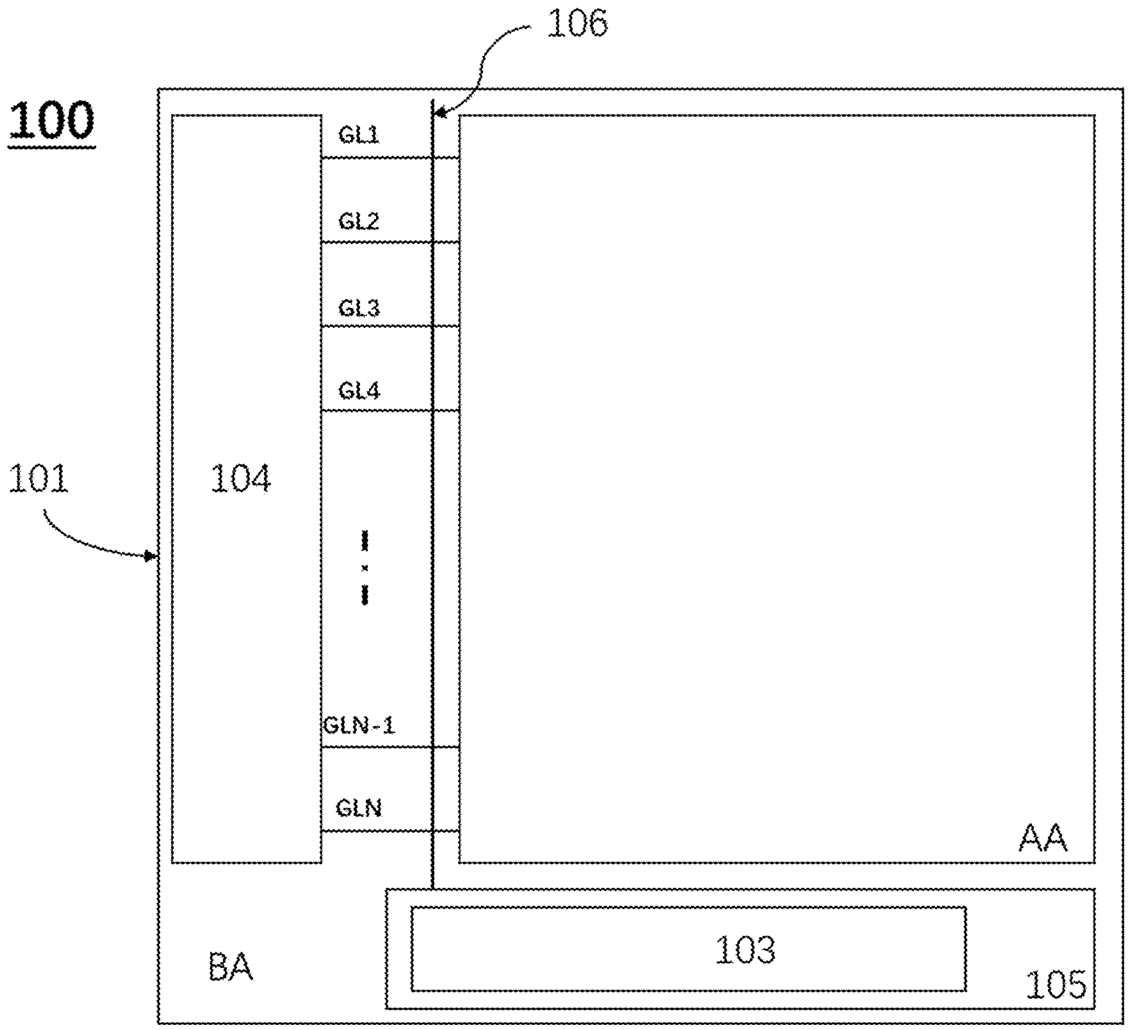
FIG. 1 is a structural diagram of a display device in one embodiment of the invention.
Figure 2:
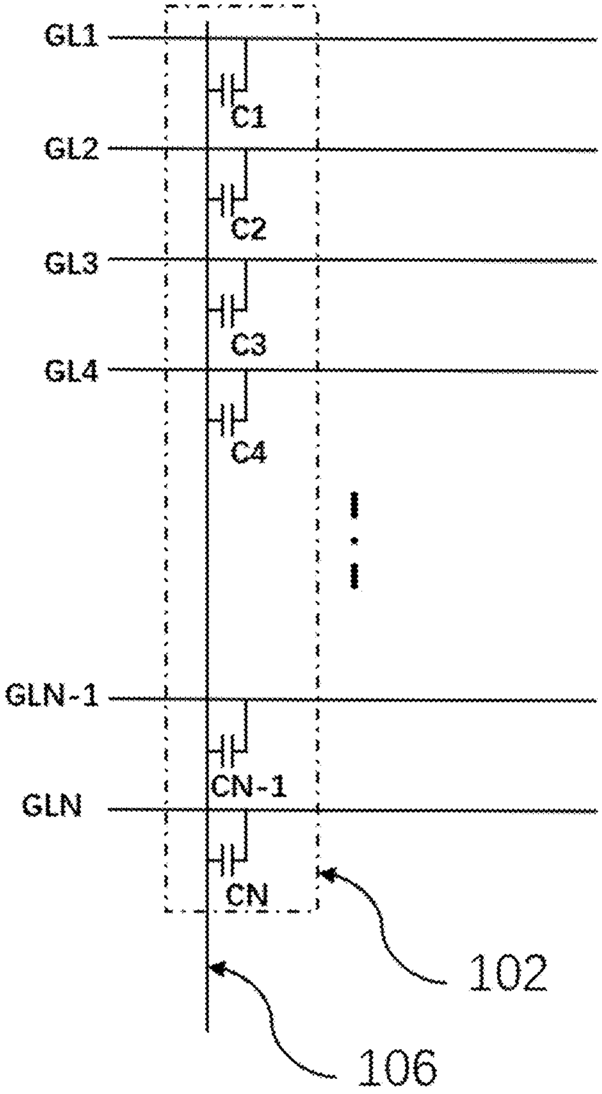
FIG. 2 is a local enlarged diagram of the display device in one embodiment of the invention.
Figure 3:
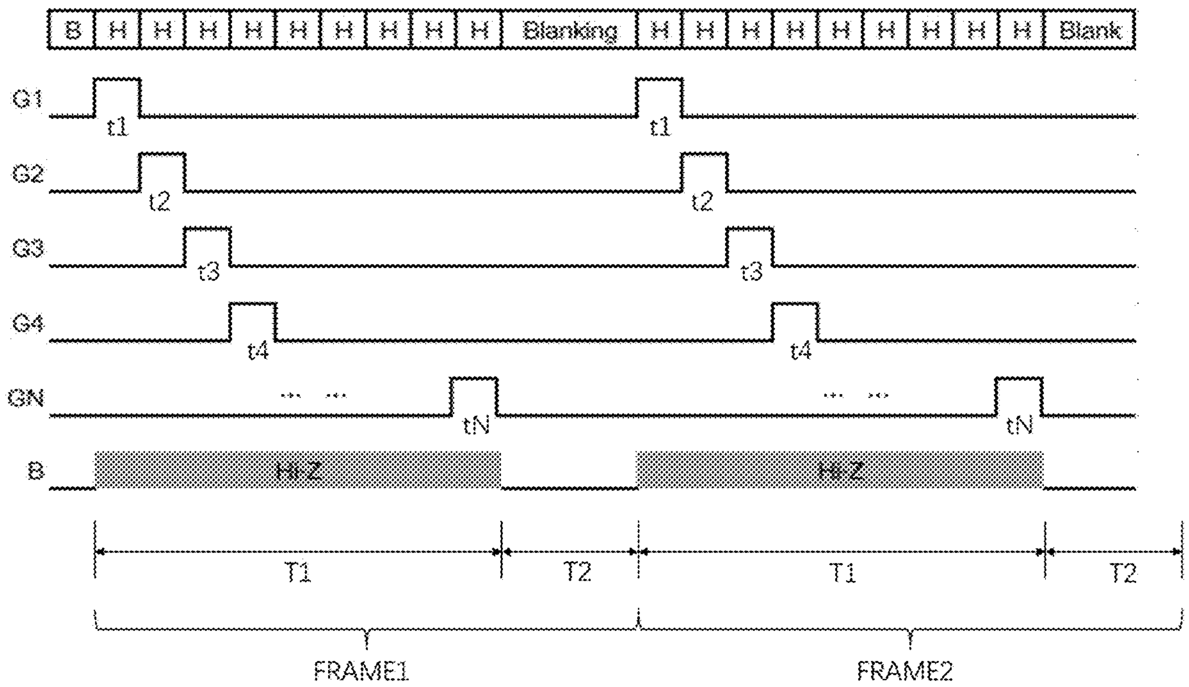
FIG. 3 is a schematic diagram of driving signals in one embodiment of the invention.
Figure 4:
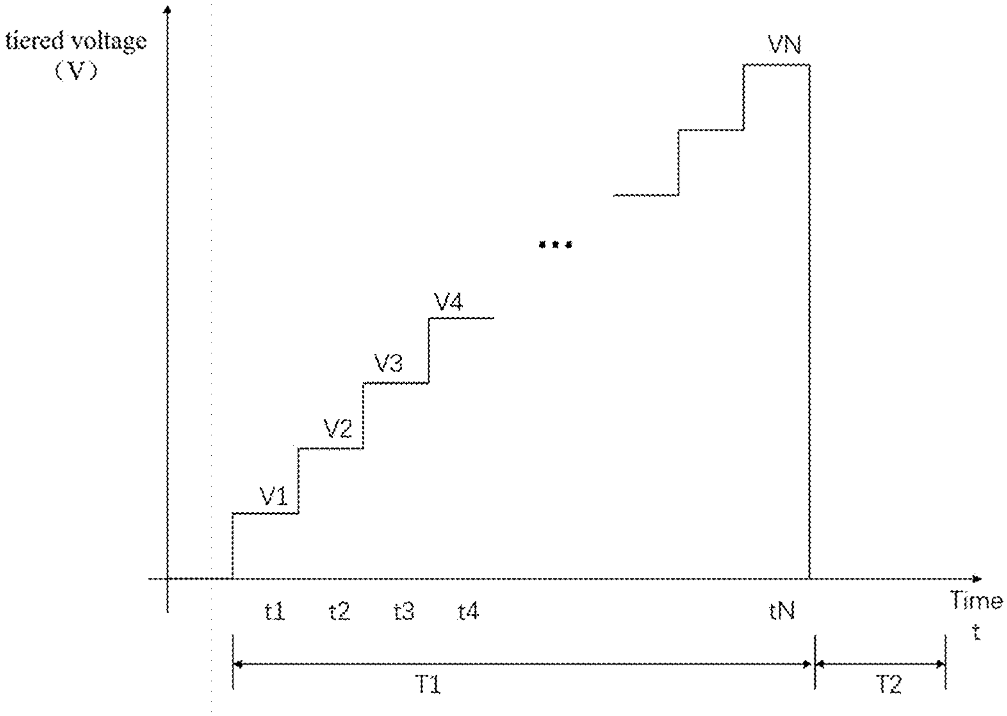
FIG. 4 is a timing diagram of a potential signal in one embodiment of the invention.
Figure 5:
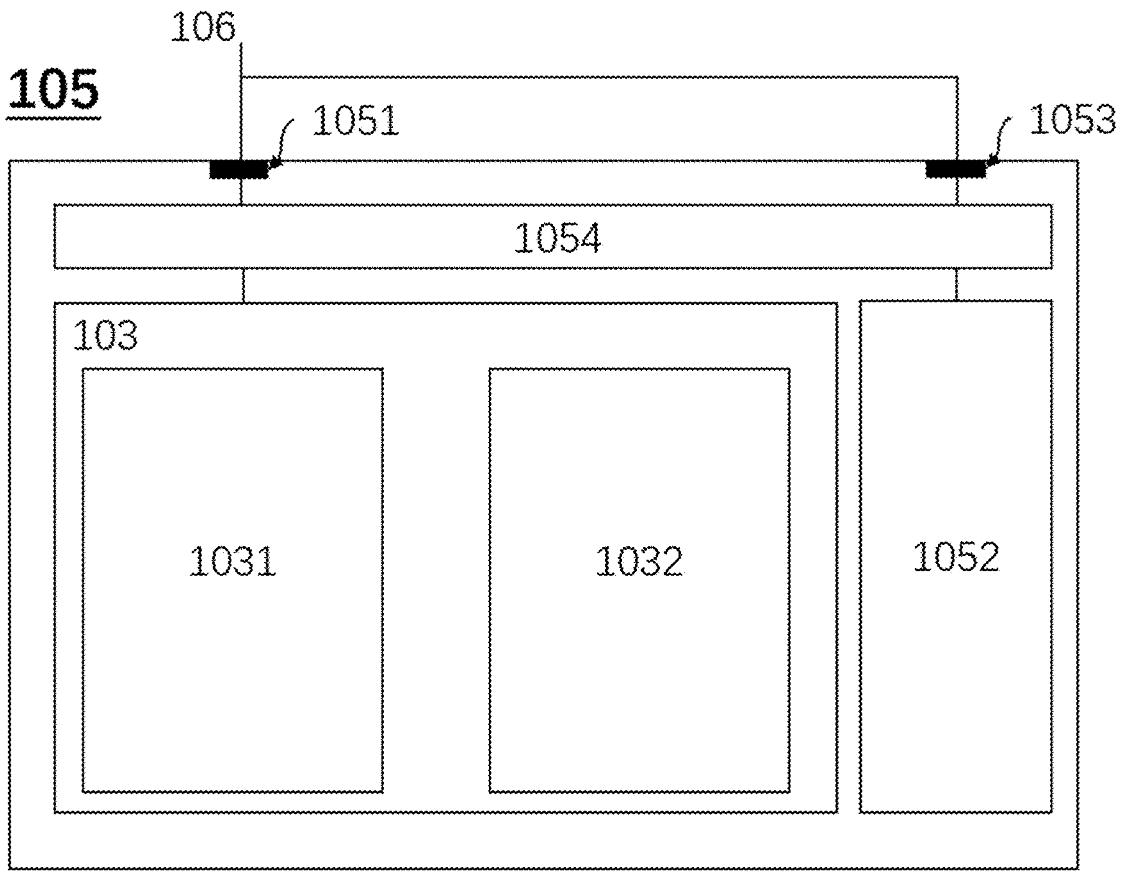
FIG. 5 is a structural diagram of a driving element in one embodiment of the invention.

Hereinafter structure principle and working principle of the invention are described in details combining with the accompanying drawings:

FIG. 1 is a structural diagram of a display device in one embodiment of the invention, FIG. 2 is a local enlarged diagram of the display device in one embodiment of the invention, FIG. 3 is a schematic diagram of driving signals in one embodiment of the invention, FIG. 4 is a timing diagram of a potential signal in one embodiment of the invention, and FIG. 5 is a structural diagram of a driving element in one embodiment of the invention. Combining FIGS. 1 to 5, a display panel 100 of the invention comprises a substrate 101, a plurality of pixel units, a plurality of signal lines, a charge coupling unit 102 and a voltage detection unit 103. The substrate 101 includes a display area AA and a peripheral area BA adjacent to each other, and the peripheral area BA is at least on one side of the display area AA. A plurality of pixel units (not shown) arranged in a matrix are formed in the display area AA. The plurality of signal lines GL1, GL2, GL3, GL4, . . . , GLN-1, and GLN are electrically connected to the plurality of corresponding pixel units in the display area AA to transmit driving signals G1, G2, G3, G4, . . . , GN-1 and GN to the plurality of corresponding pixel units, respectively. The charge coupling unit 102 corresponds to a part of all of the plurality of signal lines GL1, GL2, GL3, GL4, . . . , GLN-1, and GLN for coupling the driving signals G1, G2, G3, G4, . . . , GN-1 and GN on the signal lines GL1, GL2, GL3, GL4, . . . , GLN-1, and GLN into potential signal, and transmitting to the voltage detection unit 103. The voltage detection unit 103 is electrically connected to the charge coupling unit 102 for determining whether the driving signals G1, G2, G3, G4, . . . , GN-1 and GN are in a normal working state according to the received potential signal.

In the invention, since the corresponding at least a part of the signal lines GL1, GL2, GL3, GL4, . . . , GLN-1, and GLN on the display panel 100 are provided with the charge coupling unit 102 to couple the driving signals G1, G2, G3, G4, . . . , GN-1 and GN on the signal lines GL1, GL2, GL3, GL4, . . . , GLN-1, and GLN into potential signal, and then whether the driving signals are normal is determined via the voltage detection unit 103 according to the received potential signal, if analytical test shall be performed on the display panel 100 after the display panel 100 is produced, testing may be conveniently completed without damaging the display panel 100 to determine whether the driving signals G1, G2, G3, G4, . . . , GN-1 and GN are normal, and maintain integrity of the display panel 100, and the testing process is convenient and fast.

In one embodiment, the display panel 100 further includes a driving circuit 104 electrically connected to the signal lines GL1, GL2, GL3, GL4, . . . , GLN-1, and GLN, the driving signals G1, G2, G3, G4, . . . , GN-1 and GN of the signal lines are supplied by the driving circuit 104, and the driving signals G1, G2, G3, G4, . . . , GN-1 and GN supplied by the driving circuit 104 are timing pulse signals. Moreover, the driving circuit 104 sequentially supplies the driving signals to the signal lines GL1, GL2, GL3, GL4, . . . , GLN-1, and GLN, respectively within one driving period, and the potential signal may be a tiered voltage. As shown in FIG. 2, the driving circuit 104 is disposed in the peripheral area BA and located on one side of the display area AA, but the invention is not limited thereto, and the driving circuit 104 also may be disposed in the display area AA or disposed in the peripheral area BA and adjacent to multiple sides of the display area AA. In one embodiment, the driving circuit 104 is a gate on array (GOA) circuit.

After the display panel 100 is produced, the invention may conveniently determine whether the driving signals G1, G2, G3, G4, . . . , GN-1 and GN are normal without damaging the display panel 100 via the charge coupling unit 102 and the voltage detection unit 103, and the driving signals G1, G2, G3, G4, . . . , GN-1 and GN are supplied by the driving circuit 104, such that the invention may conveniently determine whether the driving circuit 104 is normal, and maintain integrity of the display panel 100 without damaging the display panel 100, and the testing process is convenient and fast.

In one embodiment of the invention, the display panel 100 further includes a driving element 105 disposed in the peripheral area BA, but the invention is not limited thereto, and the voltage detection unit 103 may be disposed in the driving element 105. In another embodiment, the voltage detection unit 103 also may be set separately, and the invention is explained only taking the driving circuit 104 on one side of the display area AA for example. Of course, the driving circuit 104 also may be multilateral driven, but the invention is not limited thereto. In one embodiment, the driving element 105 comprises a driver IC for driving the display panel 100, or a combination of the driver IC and a flexible circuit board (FPC) electrically connected or a chip on film (COF).

In one embodiment, the charge coupling unit 102 is formed of a plurality of coupling capacitors together. Specifically, as shown in FIG. 2, in the display panel 100, a signal detection line 106 is across over the signal lines GL1, GL2, GL3, GL4, . . . , GLN-1, and GLN, and the signal lines GL1, GL2, GL3, GL4, . . . , GLN-1, and GLN and the signal detection line 106 may have an insulation layer therebetween to be spaced apart and insulated from each other, so a region where the signal detection line 106 overlaps the signal line GL1 is formed with a coupling capacitor C1, a region where the signal detection line 106 overlaps the signal line GL2 is formed with a coupling capacitor C2, . . . , a region where the signal detection line 106 overlaps the signal line GLN is formed with a coupling capacitor CN, and the coupling capacitors C1, C2, . . . , and CN together form the charge coupling unit 102.

In one embodiment, the driving circuit 104 is located in the peripheral area BA, the signal lines GL1, GL2, GL3, GL4, . . . , GLN-1, and GLN comprises a portion in the peripheral area BA and a portion in the display area AA (not shown), and the signal detection line 106 is located in the peripheral area BA and across over the portion of the signal lines GL1, GL2, GL3, GL4, . . . , GLN-1, and GLN in the peripheral area BA, such that it is unnecessary to additionally design the circuits in the display area AA, and the structure is simple.

In the invention, taking the coupling capacitors for example, other coupling ways also can be used, and only if the driving signals G1, G2, G3, G4, . . . , GN-1 and GN on the signal lines GL1, GL2, GL3, GL4, . . . , GLN-1, and GLN are coupled into potential signal, the invention may be implemented, but the invention is not limited thereto.

Combining FIGS. 1 to 4, in one display frame FRAME1 and FRAME2, it comprises a first time period T1 and a second time period T2. The first time period T1 is a data refresh phase, and may be viewed as one driving period, and the signal lines GL1, GL2, GL3, GL4, . . . , GLN-1, and GLN sequentially supply the driving signals G1, G2, G3, G4, . . . , GN-1 and GN to the corresponding pixel units. Specifically, the first time period T1 comprises a first driving time period t1 where the signal line GL1 supplies a high potential driving signal G1 to the corresponding pixel units (such as, a first row of pixel units), a coupling voltage is formed on the coupling capacitor C1, and a potential signal with a voltage V1 is formed on the signal detection line 106, a second driving time period t2 where the signal line GL2 supplies a high potential driving signal G2 to the corresponding pixel units (such as, a second row of pixel units), the driving signal G1 of the signal line GL1 is at a low potential, a coupling voltage is formed on the coupling capacitor C2, and a potential signal with a voltage V2 is formed on the signal detection line 106, . . . , and a n-th driving time period tN where the signal line GLN supplies a high potential driving signal GN to the corresponding pixel units (such as, a N-th row of pixel units), the driving signals G1 to GN-1 of the signal lines GL1 to GLN-1 are at low potential, a coupling voltage is formed on the coupling capacitor CN, and a potential signal with a voltage VN is formed on the signal detection line 106. Accordingly, in the first time period T1, a tiered voltage V is formed on the signal detection line 106, and comprises a plurality of step voltages V1, V2, V3, V4, . . . , and VN. The voltage detection unit 103 may determine the driving signals G1, G2, G3, G4, . . . , GN-1 and GN according to the tiered voltage V. As shown in FIG. 4, in each driving time period, the tiered voltage is held unchanged, such that the step voltages are in a regular horizontal shape, and in actual operation, the invention is not limited thereto. In another embodiment, the tiered voltage V changes in a regular linear manner within each driving time period, such that each step voltage is in a regular non-horizontal step shape.

Combining FIGS. 1 to 5, the voltage detection unit 103 comprises a determination module 1031 and a result output unit 1032. After the charge coupling unit 102 couples the driving signals G1, G2, G3, G4, . . . , GN-1 and GN into potential signal, the signal detection line 106 transmits the potential signal to the determination module 1031 for determining whether the tiered voltage V of the potential signal is within a preset voltage range. For example, whether the driving signals G1, G2, G3, G4, . . . , GN-1 and GN are in a normal working state can be determined by determining whether the maximum step voltage VN of the tiered voltage V is within a preset voltage range. If the maximum step voltage VN is within the preset voltage range, it means that the driving signals G1, G2, G3, G4, . . . , GN-1 and GN are in the normal working state, and if the maximum step voltage VN is not within the preset voltage range, it means that one or more of the driving signals G1, G2, G3, G4, . . . , GN-1 and GN are in an abnormal working state, and shall be further determined. Meanwhile, the result output unit 1032 sends a result feedback signal to the driving element 105. In one embodiment, the preset voltage range comprises a plurality of voltage intervals, and each step voltage corresponds to one voltage interval. For example, the step voltage V1 corresponds to a first voltage interval, the step voltage V2 corresponds to a second voltage interval, . . . , and the step voltage VN corresponds to a N-th voltage interval. At this time, each of the step voltages V1, V2, V3, V4, . . . , and VN shall be determined, respectively, i.e., determining whether the step voltage V1 is in the first voltage interval, determining whether the step voltage V2 is in the second voltage interval, . . . , and determining whether the step voltage VN-1 is in the (N-1)th voltage interval, such that which one or more of the driving signals G1, G2, G3, G4, . . . , GN-1 and GN is determined in the abnormal working state. Meanwhile, the result output unit 1032 sends a feedback signal to the driving element 105, such that the determination module 1031 determines the abnormal driving signal lines for feedback.

Further, as shown in FIGS. 1 to 5, in the display panel 100 of the invention, the driving element 105 further comprises a charge releasing unit 1052 electrically connected to the charge coupling unit 102 through the signal detection line 106. As is stated previously, in the display panel 100, each display frame FRAME1 and FRAME2 comprises a first time period T1 and a second time period T2. The first time period T1 is a data refresh phase where the signal lines GL1, GL2, GL3, GL4, . . . , GLN-1, and GLN supply the driving signals G1, G2, G3, G4, . . . , GN-1 and GN to the pixel unit sequentially, and the second time period T2 is a blanking phase where the charge releasing unit 1052 releases coupled charge in the charge coupling unit 102, i.e., emptying charge coupled in the charge coupling unit 102, so as to facilitate being detected again in the next display frame while not affecting display of the display panel 100. In one embodiment, it can be implemented by connecting the signal detection line 106 to the ground GND, but the invention is not limited thereto.

When applied to a terminal display device, the display panel 100 of the invention may make electrical monitoring in the data refresh time period using the charge coupling unit 102 and the voltage detection unit 103 via charge coupling effect of the driving signals outputted by the driving circuit 104, remove the coupled charge in the circuits to restore at the blanking phase, so as to electrically monitor the driving circuit 104, and determine via the driving element 105, and since the driving element 105 may communicate with the terminal display device, such as, outputting the feedback signal, the terminal display device can acquire conditions of the driving circuit 104 of the current display panel 100.

As shown in FIG. 5, the driving element 105 includes a first pin 1051 electrically connected to the charge coupling unit 102 and the voltage detection unit 103, respectively, such that the signal detection line 106 electrically connects the charge coupling unit 102 to the voltage detection unit 103 through the first pin 1051 of the driving element 105. In one embodiment, the driving element 105 further includes a second pin 1053 electrically connected to the charge coupling unit 102 and the charge releasing unit 1052, respectively, such that the signal detection line 106 electrically connects the charge coupling unit 102 to the charge releasing unit 1052 through the second pin 1053 of the driving element 105.

Further, the first pin 1051, the second pin 1053 and the voltage detection unit 103, the charge releasing unit 1052 further comprise a switch unit 1054 therebetween for controlling on and off between the first pin 1051 and the voltage detection unit 103, and controlling on and off between the second pin 1053 and the voltage releasing unit 1052, so as to control whether determining coupled potential in the charge coupling unit 102 or emptying coupled charge in the charge coupling unit 102.

Specifically, as shown in FIGS. 3 to 5, in one display frame FRAME, in the first time period T1, the switch unit 1054 is turned on between the first pin 1051 and the voltage detection unit 103, thereby turning on between the voltage detection unit 103 and the charge coupling unit 102, and meanwhile, the switch unit 1054 is turned off between the second pin 1053 and the charge releasing unit 102, thereby turning off between the charge releasing unit 1052 and the charge coupling unit 102. At this time, the voltage detection unit 103 receives and determines potential signal coupled in the charge coupling unit 102. In the second time period T2, the switch unit 1054 is turned off between the first pin 1051 and the voltage detection unit 103, thereby turning off between the voltage detection unit 103 and the charge coupling unit 102, and meanwhile, the switch unit 1054 is turned on between the second pin 1053 and the charge releasing unit 102, thereby turning on between the charge releasing unit 1052 and the charge coupling unit 102. At this time, the charge releasing unit 1052 empties coupled charge in the charge coupling unit 102, and the tiered voltage V becomes low potential, such as, 0.

In FIG. 5, the signal detection line 106 achieves connection among the charge coupling unit 102, the voltage detection unit 103 and the charge releasing unit 1052 through different pins of the driving element 105, respectively, and since the voltage detection unit 103 and the charge releasing unit 1052 work at different time periods, in other embodiments, electrical connection also can be achieved through the same pin, but the invention is not limited thereto. That is, the first pin 1051 and the second pin 1053 may be the same pin or different pins on the driving element 105.

Of course, the display panel further has other components, and the details are not described here.

Figure 6:
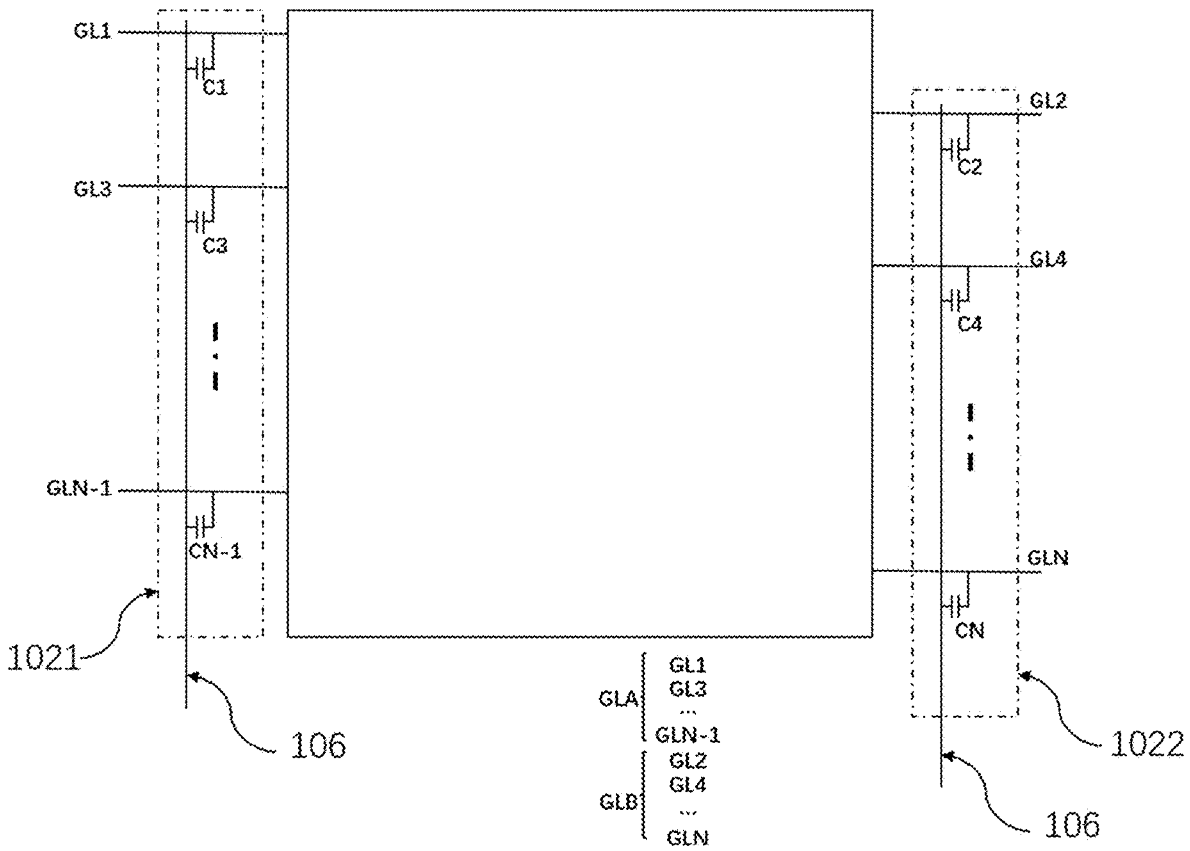
FIG. 6 is a structural diagram of a display device in another embodiment of the invention.

In the embodiment of FIGS. 1 to 5, the driving circuit 104 is located on one side of the display area AA, and supplies the driving signals G1, G2, G3, G4, . . . , GN-1 and GN to all signal lines GL1, GL2, GL3, GL4, . . . , GLN-1 and GLN sequentially, and the signal detection line 106 is across over all signal lines GL1, GL2, GL3, GL4, . . . , GLN-1 and GLN. Referring to FIG. 6, FIG. 6 is a local enlarged diagram of a display device in another embodiment of the invention. As shown in FIG. 6, the driving circuit 104 is located on two opposite sides of the display area AA, and groups the signal lines GL1, GL2, GL3, GL4, . . . , GLN-1 and GLN. For example, the odd-numbered signal lines GL1, GL3, . . . , GLN-1 are the first group of signal lines GLA, the even-numbered signal lines GL2, GL4, . . . , GLN are the second group of signal lines GLB, and correspondingly, the first group of signal lines GLA and the second group of signal lines GLB are provided with the signal detection lines 106, respectively. The charge coupling unit 102 comprises a first coupling unit 1021 and a second coupling unit 1022, and the voltage detection unit 103 comprises a first detection unit electrically connected to the first coupling unit 1021 and a second detection unit electrically connected to the second coupling unit 1022. The driving circuit 104 on one side of the display area AA supplies the driving signals to the first group of signal lines GLA, and the driving circuit 104 on the other side of the display area AA supplies the driving signals to the second group of signal lines GLB. The first coupling unit 1021 comprises coupling capacitors C1, C3, . . . , CN-1 formed between the corresponding signal detection line 106 and the first group of signal lines GLA, and the second coupling unit 1022 comprises coupling capacitors C2, C4, . . . , CN formed between the corresponding signal detection line 106 and the second group of signal lines GLB. The first detection unit detects the driving signals of the first group of signal lines GLA, and the second detection unit detects the driving signals of the second group of signal lines GLB to determine whether the driving circuits on both sides of the display area AA are normal, respectively. In other embodiments, the signal detection line 106 may be provided only for the first group of signal lines GLA, such that the voltage detection unit 103 only detects the driving signals of the first group of signal lines GLA. Of course, the signal detection line 106 also may be provided only for the second group of signal lines GLB, such that the voltage detection unit 103 only detects the driving signals of the second group of signal lines GLB, but the invention is not limited thereto.

In another embodiment, other group ways also may be used. For example, the signal lines GL1 to GLk are the first group of signal lines, and the signal lines GLk+1 to GLN are the second group of signal lines, where 1<k<N. The driving circuit 104 supplies the driving signals to the first group of signal lines and the second group of signal lines. Correspondingly, the first group of signal lines and the second group of signal lines are provided with the signal detection lines 106, respectively. The charge coupling unit 102 comprises a first coupling unit and a second coupling unit. The first coupling unit comprises coupling capacitors C1, C2, . . . , Ck formed between the corresponding signal detection line 106 and the first group of signal lines, and the second coupling unit comprises coupling capacitors Ck+1, Ck+2, . . . , CN formed between the corresponding signal detection line 106 and the second group of signal lines. The voltage detection unit 103 detects the driving signals of the first group of signal lines and the second group of signal lines to determine whether the driving circuit 104 is normal. In other embodiments, the signal detection line 106 may be provided only for the first group of signal lines, such that the voltage detection unit 103 only detects the driving signals of the first group of signal lines. Of course, the signal detection line 106 also may be provided only for the second group of signal lines, such that the voltage detection unit 103 only detects the driving signals of the second group of signal lines, but the invention is not limited thereto.

Figure 7:
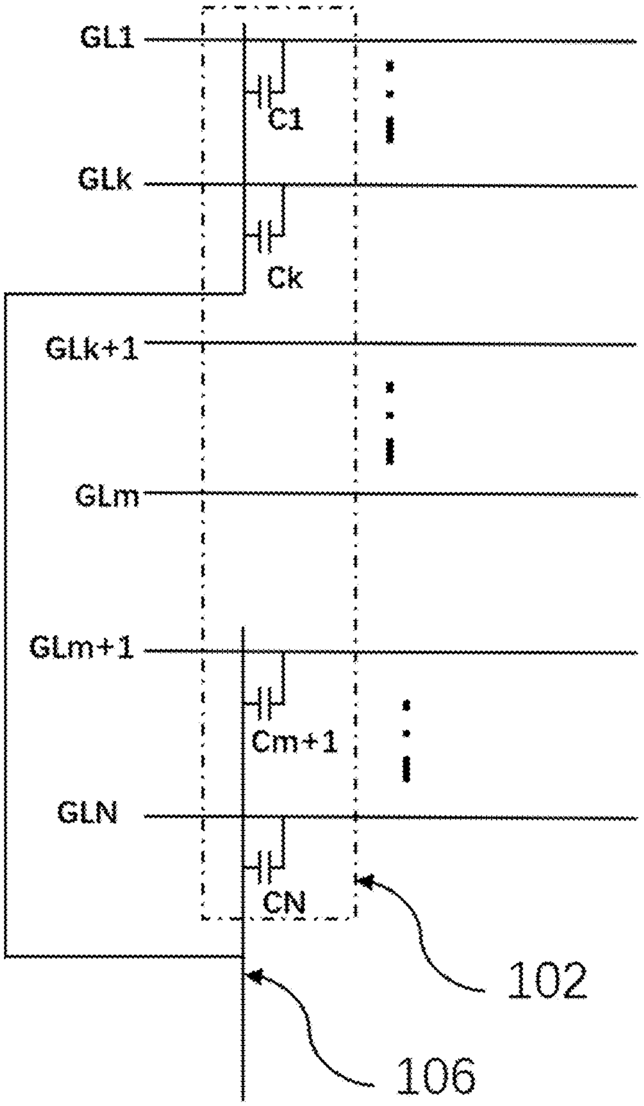
FIG. 7 is a local enlarged diagram of a display device in still another embodiment of the invention.

Of course, the signal lines GL1, GL2, GL3, GL4, . . . , GLN-1 and GLN also may be divided into more groups, such as, three groups shown in FIG. 7. The signal lines GL1 to GLk are the first group of signal lines, the signal lines GLk+1 to GLm are the second group of signal lines, the signal lines GLm+1 to GLN are the third group of signal lines, and correspondingly, the first group of signal lines and the third group of signal lines are provided with the signal detection lines 106, respectively. The charge coupling unit 102 comprises a first coupling unit and a second coupling unit, and the voltage detection unit 103 comprises a first detection unit electrically connected to the first coupling unit and a second detection unit electrically connected to the second coupling unit. The first coupling unit is formed between the corresponding signal detection line 106 and the first group of signal lines, and the second coupling unit is formed between the corresponding signal detection line 106 and the third group of signal lines. The voltage detection unit 103 detects the driving signals of the first group of signal lines and the third group of signal lines, can detect using the same detection unit, and also can detect the first group of signal lines using the first voltage detection unit, and detect the third group of signal lines using the second voltage detection unit. Of course, other group ways also may be used for detection, but the invention is not limited thereto. In another embodiment, the signal detection line 106 also may be provided only for the second group of signal lines, and the voltage detection unit 103 may only detect the driving signals of the second group of signal lines, but the invention is not limited thereto. In FIG. 7, the two signal detection lines 106 are connected, and detection may be performed through the same detection unit, but the invention is not limited thereto. For example, the signal detection lines 106 are not interconnected, and detection may be performed through different detection units, respectively.

Alternatively, in another embodiment, a certain number of signal lines can be selected to be one group, and the signal lines that easily have abnormal state also may be only detected after pooled analysis based on detection results, such that the signal detection lines 106 are only across over a part of signal lines GL1, GL2, GL3, GL4, . . . , GLN-1 and GLN, for example, across over the signal lines GLP, GLP+1, . . . , GLQ, where P≥1, and Q≤N, such that the voltage detection unit 103 only detects the driving signals of this part of signal lines GLP, GLP+1, . . . , GLQ, but the invention is not limited thereto.

The invention further provides a method for detecting a display panel, which is configured to detect the display panel 100. Combining FIGS. 1 to 6, the detection method of the invention comprises:

- step one, acquiring, by a voltage detection unit 103, potential signal of a charge coupling unit 102 in the display panel 100; and
- step two, determining whether the potential signal of the charge coupling unit 102 are within a preset voltage range.

Specifically, in the display panel 100, after the charge coupling unit 102 couples the driving signals G1, G2, G3, G4, . . . , GN-1 and GN into potential signal, the signal detection line 106 transmits the potential signal to a determination module 1031 for determining whether a tiered voltage V of the potential signal is within a preset voltage range. For example, whether the driving signals G1, G2, G3, G4, . . . , GN-1 and GN are in a normal working state can be determined by determining whether the maximum step voltage VN of the tiered voltage V is within a preset voltage range. If the maximum step voltage VN is within the preset voltage range, it means that the driving signals G1, G2, G3, G4, . . . , GN-1 and GN are in a normal working state, and if the maximum step voltage VN is not within the preset voltage range, it means that one or more of the driving signals G1, G2, G3, G4, . . . , GN-1 and GN are in an abnormal working state, and shall be further determined. Meanwhile, the result output unit 1032 sends a result feedback signal to the driving element 105. In one embodiment, the preset voltage range comprises a plurality of voltage intervals, and each step voltage corresponds to one voltage interval. For example, the step voltage V1 corresponds to a first voltage interval, the step voltage V2 corresponds to a second voltage interval, . . . , and the step voltage VN corresponds to a N-th voltage interval. At this time, each step voltage V1, V2, V3, V4, . . . , and VN shall be determined, respectively, i.e., determining whether the step voltage V1 is located in the first voltage interval, determining whether the step voltage V2 is located in the second voltage interval, . . . , and determining whether the step voltage VN-1 is located in the (N-1)th voltage interval, such that which one or more of the driving signals G1, G2, G3, G4, . . . , GN-1 and GN is determined in the abnormal working state. Meanwhile, the result output unit 1032 sends a feedback signal to the driving element 105, and the determination module 1031 determines the abnormal driving signal lines for feedback.

The charge releasing unit 1052 is electrically connected to the charge coupling unit 102 through the signal detection line 106. In the display panel 100, each display frame FRAME1 and FRAME2 comprises a first time period T1 and a second time period T2. The first time period T1 is a data refresh phase where the signal lines GL1, GL2, GL3, GL4, . . . , GLN-1, and GLN supply the driving signals G1, G2, G3, G4, . . . , GN-1 and GN to the pixel units sequentially, and the second time period T2 is a blanking phase where the charge releasing unit 1052 releases coupled charge in the charge coupling unit 102, so as to facilitate being detected again in the next display frame while not affecting display of the display panel 100. In one embodiment, it may be implemented by connecting the signal detection line 106 to the ground GND, but the invention is not limited thereto.

The invention further provides a display device comprising any of the display panel described above.

The invention further provides a storage medium for storing computer programs, and the computer programs are configured to perform any of the detection method described above.

According to the embodiments of the invention, the charge coupling unit is formed for transmitting the potential signal coupled on the signal lines to the voltage detection unit, and determining whether the potential signal are within a preset voltage range where the driving signals normally work through the signal detection lines across over the signal lines, such that a total tiered voltage can be determined, and each stage of the step voltages in the tiered voltage also can be determined, thereby simplifying the detection process, improving detection efficiency, and ensuring integrity of the product in the detection procedure.

Of course, the invention may further have various other embodiments, and those skilled in the art shall make various corresponding modifications and variations according to the invention without departing from spirit and essence of the invention, but these corresponding modifications and variations shall belong to the protection scope of the appended claims of the invention.

What is claimed is:

1. A display panel, comprising:

- a substrate having a display area;
- a plurality of pixel units disposed in the display area;
- a plurality of signal lines electrically connected to the plurality of pixel units to transmit driving signals to the plurality of pixel units;
- a charge coupling circuit corresponding to at least a part of the plurality of signal lines for coupling the driving signals into a potential signal; and
- a voltage detector electrically connected to the charge coupling circuit for receiving the potential signal and determining the driving signals;

the display panel further comprises:

- a signal detection line at least partially overlapping the plurality of signal lines; wherein, the charge coupling circuit is disposed between the plurality of overlapped signal lines and the signal detection line.

2. The display panel according to claim 1, wherein the driving signals are timing pulse signals, and the potential signal is a tiered voltage.

3. The display panel according to claim 2, wherein the voltage detector comprises:

a determination circuit for determining whether the tiered voltage is within a preset voltage range.

4. The display panel according to claim 3, wherein the voltage detector further comprises:

a result output circuit for outputting a feedback signal when the tiered voltage is not within the preset voltage range.

5. The display panel according to claim 3, wherein the tiered voltage comprises a plurality of step voltages, the preset voltage range comprises a plurality of voltage intervals, and each step voltage corresponds to one voltage interval.

6. The display panel according to claim 1, wherein the plurality of signal lines comprise a first group of signal lines and a second group of signal lines, the voltage detector comprises a first detector, and the charge coupling circuit comprises a first coupling circuit electrically connected to the first detector and corresponding to the first group of signal lines.

7. The display panel according to claim 6, wherein the plurality of signal lines further comprise a third group of signal lines, the voltage detector further comprises a second detector, and the charge coupling circuit comprises a second coupling circuit electrically connected to the second detector and corresponding to the third group of signal lines.

8. The display panel according to claim 2, wherein the display panel further comprises:

a driving circuit electrically connected to the plurality of signal lines for sequentially supplying the timing pulse signal to the plurality of signal lines within one driving period.

9. The display panel according to claim 1, wherein the display panel further includes a peripheral area at least on one side of the display area, and the display panel further comprises:

a driving element located in the peripheral area, wherein the voltage detector is provided on the driving element.

10. The display panel according to claim 9, wherein the driving element comprises a first pin electrically connected to the charge coupling circuit and the voltage detector, respectively.

11. The display panel according to claim 10, wherein the driving element further comprises:

a charge releasing circuit electrically connected to the charge coupling circuit.

12. The display panel according to claim 11, wherein the driving element comprises a second pin electrically connected to the charge coupling circuit and the charge releasing unit circuit, respectively.

13. The display panel according to claim 12, wherein the first pin and the second pin are the same pin or different pins.

14. The display panel according to claim 11, wherein a display frame comprises a first time period where the voltage detector determines the driving signals, and a second time period where the charge releasing circuit releases coupled charge in the charge coupling circuit.

15. The display panel according to claim 14, wherein the first time period is a data refresh phase, and the second time period is a blanking phase.

16. The display panel according to claim 14, wherein the driving element further comprises a switch unit disposed between the charge coupling circuit and the voltage detector as well as the charge releasing circuit, wherein, in the first time period, the switch unit is turned on between the charge detector and the charge coupling circuit, and turned off between the charge releasing circuit and the charge coupling circuit;

in the second time period, the switch unit is turned off between the charge detector and the charge coupling circuit, and turned on between the charge releasing circuit and the charge coupling circuit.

17. A method for detecting a display panel, wherein the method is configured to detect the display panel according to claim 1, comprising:

acquiring the potential signal of the charge coupling circuit; and determining whether the potential signal is within a preset voltage range;

furthermore, transmitting the potential signal coupled on the signal lines to the voltage detector, and determining whether the potential signal is within a preset voltage range where the driving signals work through the signal detection lines across over the signal lines.

18. The detection method according to claim 17, wherein the potential signal is a tiered voltage, and the method further comprises:

outputting a feedback signal when the tiered voltage is not within the preset voltage range.

19. The detection method according to claim 17, wherein the method further comprises: releasing coupled charge in the charge coupling circuit.

* * * * *